United States Patent
Gupta et al.

(10) Patent No.: US 8,127,287 B2
(45) Date of Patent: Feb. 28, 2012

(54) SYSTEMS AND METHODS FOR REUSING SAP ADAPTORS IN NON-SUPPORTED RELEASES

(76) Inventors: Baljit Singh Gupta, Fremont, CA (US); Ranvir Singh, Fremont, CA (US)

( * ) Notice: Subject to any disclaimer, the term of this patent is extended or adjusted under 35 U.S.C. 154(b) by 1024 days.

(21) Appl. No.: 11/960,702

(22) Filed: Dec. 20, 2007

(65) Prior Publication Data

US 2009/0164988 A1   Jun. 25, 2009

(51) Int. Cl.
*G06F 9/44* (2006.01)
(52) U.S. Cl. ...................................................... 717/170
(58) Field of Classification Search ........... 717/168–178
See application file for complete search history.

(56) References Cited

U.S. PATENT DOCUMENTS

| | | | |
|---|---|---|---|
| 2002/0099726 A1* | 7/2002 | Crudele et al. | 707/200 |
| 2006/0248507 A1 | 11/2006 | Benjes | |
| 2007/0203881 A1 | 8/2007 | Schaad | |

OTHER PUBLICATIONS

IBM, WebSphere Adapters, Version 6.0, http://publib.boulder.ibm.com/infocenter/wbihelp/v6rxmx/index.jsp?topic=%2Fcom.ibm.wsadapters.jca_jdbc.doc%2Fwelcome_wsa_jdbc.html, IBM, IBM 2005, whole document from the web site. Screen captures 14 pages which were used as references (websphere_adapters.pdf).*
Gleb Naumovich and Paolina Centonze, "Static Analysis of RoleBased Access Control in J2EE Applications," TAV-WEB Proceedings/ACM SIGSOFT SEN, Sep. 2004 vol. 29 No. 5, pp. 1-10.*

* cited by examiner

*Primary Examiner* — Li Zhen
*Assistant Examiner* — Duy Khuong Nguyen
(74) *Attorney, Agent, or Firm* — Tran & Associates (57) ABSTRACT

An adaptor provides functionality in a second version of a software to a first version by determining at least one functionality available in the second version but not available in the first version; determining a reuse or adaptation of an adaptor framework in the first version; mapping the functionality of the second version to the first version; importing code in the second version to the first version; and deploying the adaptor framework in the first version.

20 Claims, 5 Drawing Sheets

SYSTEMS AND METHODS FOR REUSING SAP ADAPTORS IN NON-SUPPORTED RELEASES

BACKGROUND

Ensuring that customers have properly deployed access controls across the enterprise is a top priority today. Regulatory mandates such as the Sarbanes-Oxley Act in the United States, Combined Code and the Turnbull Report in the United Kingdom, and KonTraG in Germany require organizations to prove that they have strong, effective access and authorization controls in place. In general, access control to an information resource is based on a reference monitor evaluating an access request against a static set of access rights associated to a principle or role. However, context information may also be taken into consideration to decide whether access should or should not be granted. Such context may be the operations a user has already executed in a workflow, the business objects he accessed in the past but also more abstract context like temperature or location. This, however, raises a set of problems that no current system appears to address satisfactorily.

To address this need, vendors offer access control applications for monitoring, testing, and enforcing access and authorization controls across the enterprise. One vendor known as SAP provides these applications as part of the SAP GRC solutions for governance, risk, and compliance (SAP solutions for GRC), include Virsa Compliance Calibrator, Virsa Access Enforcer, Virsa Role Expert, and the Virsa FireFighter application for SAP. These solutions require customers to deploy the software correctly and adjust it to fit the organization's own regulatory and industry-specific needs. The enterprise may have thousands of access rights-related rules and interdependencies across the enterprise application systems.

United States Patent Application 20070203881 to SAP describes an access control system that provides access control to at least one information resource associated with at least one application within a computer network. The system includes a plurality of context sources being relevant for at least one application and providing context information, a constraint specification console providing an interface to specify application specific constraints based on the context sources, a rule engine capable of handling facts and applying inference rules on those facts, an application specific constraint enforcement point configured for receiving access requests, hence querying facts and further being responsible for making access decisions regarding the information resource based on those facts and on application specific constraints and a rule engine adaptor acting as intermediary in communication of the rule engine with the context sources, the constraint specification console and the enforcement point, respectively, so as to allow access control to the at least one information resource based on specified application specific constraints with regard to context information originating from the context sources. However, these capabilities exist in new versions of the software, leaving older versions of the software without the capability to enforce real-time access control due to missing adapter framework/connectivity.

SUMMARY OF THE INVENTION

In one aspect, a method provides functionality of a second version of a software to a first version by determining at least one functionality available in the second version but not available in the first version; determining a reuse or adaptation of an adaptor framework in the first version; mapping the functionality of the second version to the first version; importing code in the second version to the first version; and deploying the adaptor framework in the first version.

In another aspect, a system includes an adaptor to provide functionality in a second version of a software to a first version by determining at least one functionality available in the second version but not available in the first version; determining a reuse or adaptation of an adaptor framework in the first version; mapping the functionality of the second version to the first version; importing code in the second version to the first version; and deploying the adaptor framework in the first version; and a backend system coupled to the adaptor.

The adaptors allows SAP Customers currently using older versions of SAP software to be connected Real-time with the existing SAP GRC Access control application without mandating the need to upgrade to a newer version of SAP. This is made possible by the innovative design of DGN technical team in reusing the current adapter framework effectively in the VIRSA/namespace for the older versions of SAP, thereby providing a seamless integration with the SAP GRC access control suite.

The adaptors offer the following advantages: real-time connectivity to older SAP versions; allows customers to leverage key features of the SAP GRC access; enables the control suite to rapidly identify and remove access and authorization risk from enterprise application systems and embed preventive controls into business processes to stop future violations. The result is a dramatic reduction in the time, risk, and cost associated with compliance by automating the analysis of rules and dependencies, detection of potential risks, and generation of reports and escalations to ensure compliance. The system enables a creative use of the /VIRSA/namespace to eliminate the need for code change or modification of the SAP GRC Access Controls Suite.

DESCRIPTION

Figure 1:
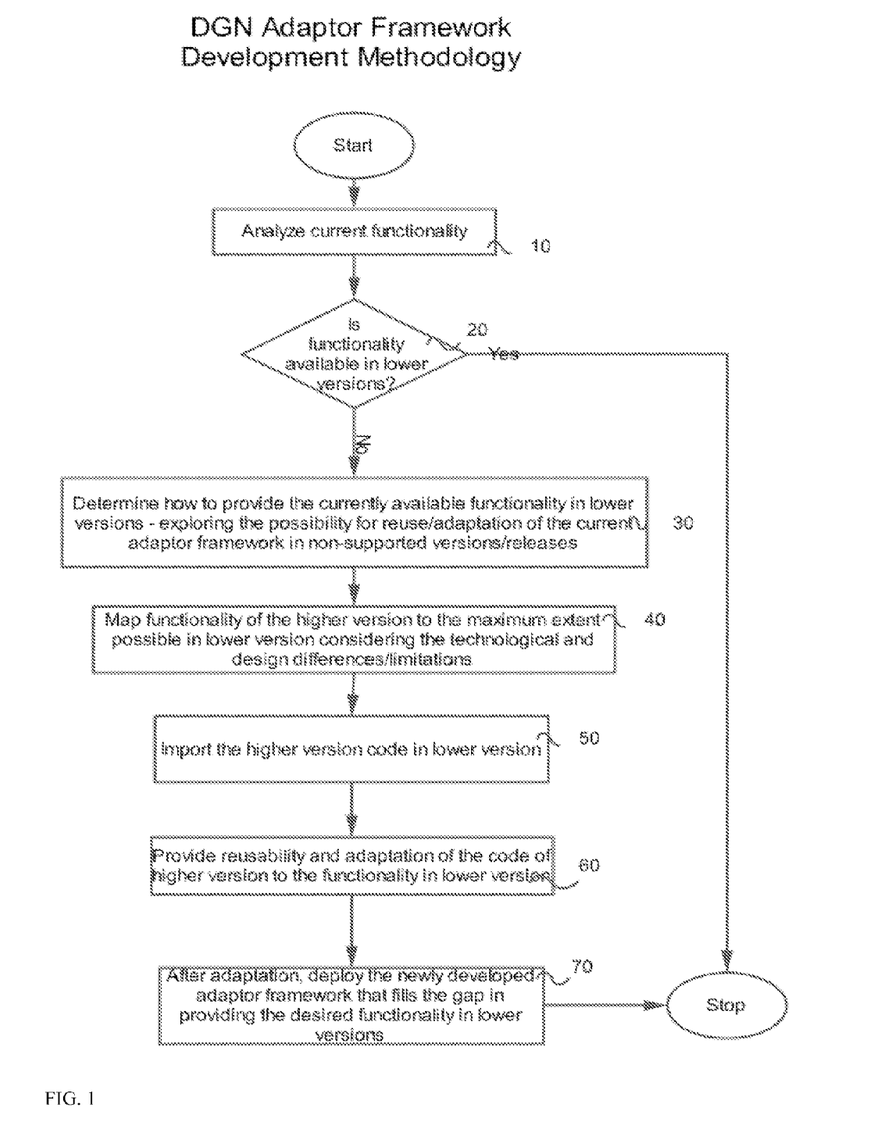
FIG. 1 shows an exemplary adaptor framework development methodology.

FIG. 1 shows an exemplary adaptor framework development methodology. First, the process analyzes the current functionality of the current (or the second) version of the software (10). Next, the process determines whether the functionality is available in the lower or first version software (20). If so, the process exits. Alternatively, if the functionality is not available in the first version software, a migration operation begins. In this operation, the process analyzes how to provide the functionality currently available in the second version software to the older or first version software (30). This analysis includes exploring the possibility of reusing or adapting the current adaptor framework in the first version software or in the versions/releases that do not support the new functionality. Next, the process maps the functionality of the second version so that as much of the functionality is supported in the first version of the software (40). The process then imports the code for the second version software into the first version software (50). The process then tunes the reusability and adaptation of the second version code to provide the functionality in the first version of the software (60). After adaptation, the process deploys the newly developed framework to fill the functionality gap between the first and second version software (70). The adaptor allows older versions of SAP software to support the reuse/adaptation of the adaptor framework, considering the technological and design differences/limitations. The adaptor allows features supported in SAP's latest software version to be supported in older versions of the software. In one embodiment, the adaptor enables enterprises to rapidly identify and remove access and authorization risk from enterprise application systems and embed preventive controls into business processes to stop future violations. The result is a dramatic reduction in the time, risk, and cost associated with compliance. The access control software automates the analysis of rules and dependencies, detection of potential risks, and generation of reports and escalations to ensure compliance.

Figure 2:
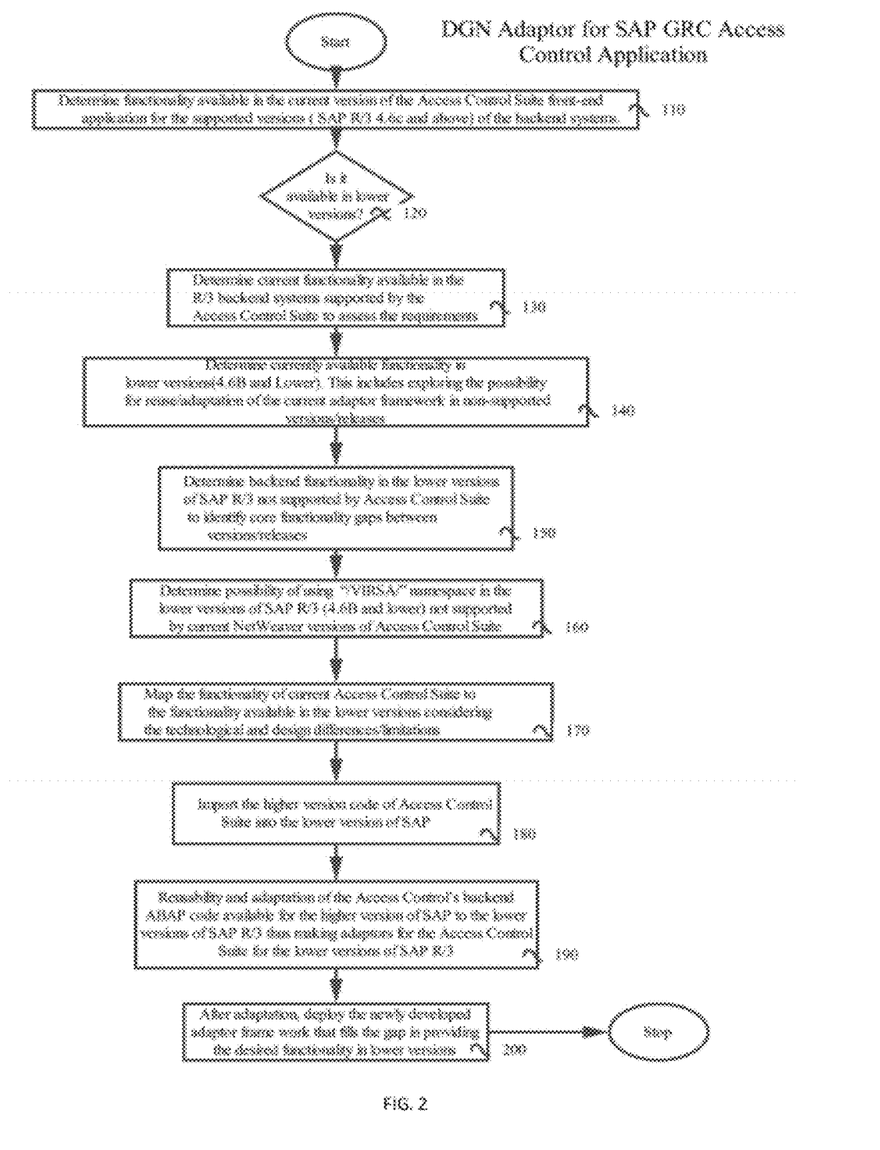
FIG. 2 shows an exemplary adaptor for SAP GRC Access Control Application.

FIG. 2 shows an exemplary adaptor for SAP GRC Access Control Application. First, the process analyzes the current functionality of the current (or the second) version of the access control suite frontend application for supported versions such as SAP R/3 of the backend system software (110). Next, the process determines whether the functionality is available in the lower or first version software (120). If so, the process exits. Alternatively, if the functionality is not available in the first version software, a migration operation begins. In this operation, the process analyzes how to provide the functionality currently available in the second version software to the older or first version software such as SAP versions 4.6B and lower (130). The process analyzes the possibility of reusing or adapting the current adaptor framework in the first version software or in the versions/releases that do not support the new functionality (140). The process determines whether the backend functionality in the first version of SAP R/3 is supported by the Access Control Suite software and identifies core functionality gaps between the first and second software versions (150).

The process then analyzes the ability to use the "/VIRSA/" name space in the first version software SAP R/3 (4.6B and lower) which is not supported by the current NetWeaver versions of the SAP Access Control Suite (160). Next, the process maps the functionality of the second version Access Control Suite so that as much of the functionality is supported in the first version of the software (170). The process then imports the code for the second version software into the first version software (180). The process then tunes the reusability and adaptation of the second version code to provide the functionality in the first version of the SAP R/3 software (190). After adaptation, the process deploys the newly developed framework to fill the functionality gap between the first and second version software (200). The adaptor allows older versions of SAP software to support the reuse/adaptation of the adaptor framework, considering the technological and design differences/limitations.

Figure 3:
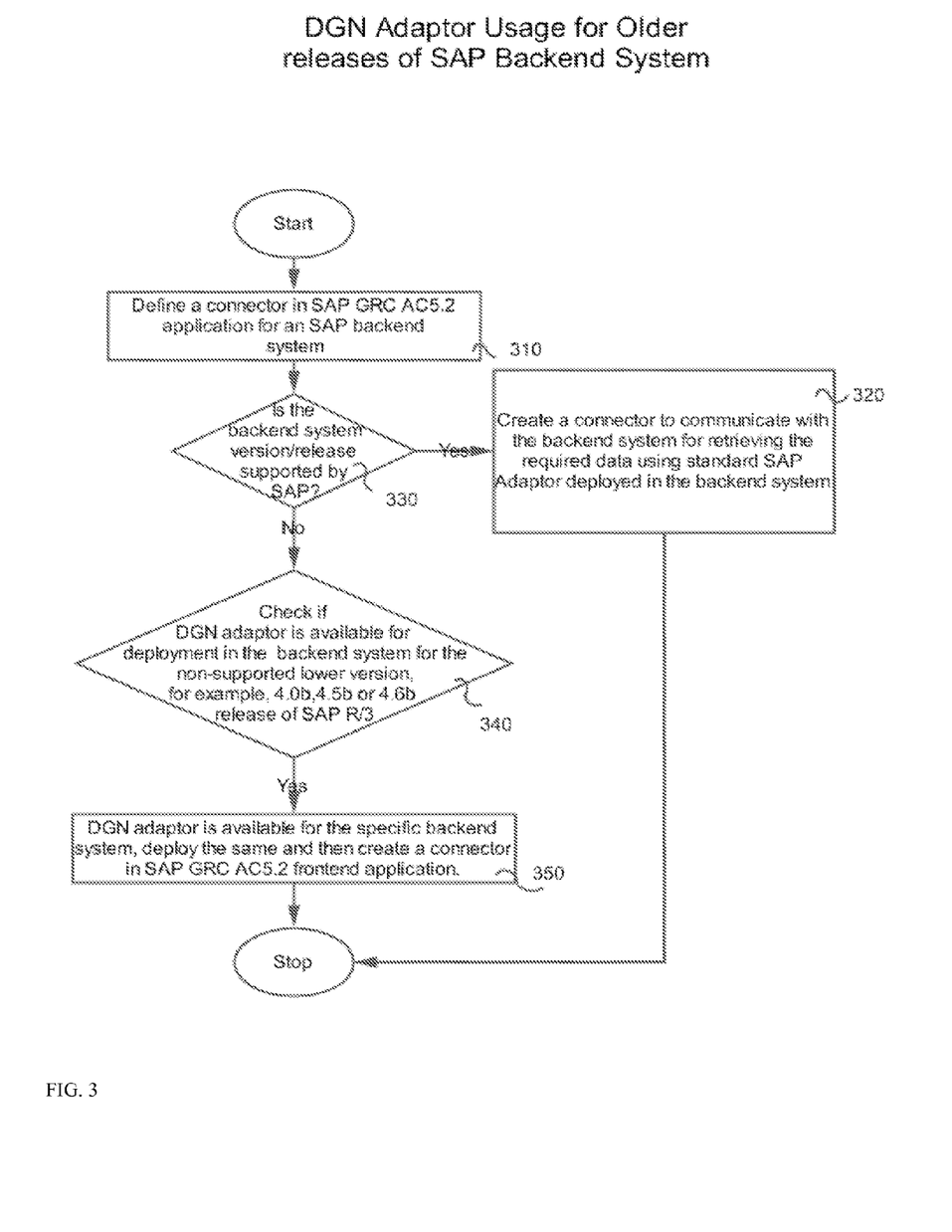
FIG. 3 shows an exemplary adaptor usage for prior releases of the SAP back-end system.

FIG. 3 shows an exemplary adaptor usage for prior releases of the SAP back-end system. The process defines a connector in the SAP GRC AC5.2 application for an SAP backend system (310). The process then checks if the backend system version or release is supported by the SAP system (330). If so, the process creates a connector to communicate with the backend system for retrieving the required data using the standard SAP adaptor deployed in the backend system (320). Alternatively, if the backend system version/release is not supported, the process checks if a custom adaptor is available for deployment in the backend system for the non-supported first version software such as versions 4.0b, 4.5b or 4.6b release of SAP R/3 (340). If one is available, the process deploys the custom adaptor and creates a connector in the front end application such as the SAP GRC AC5.2 front end application (350). The adaptors offer the following advantages: real-time connectivity to older SAP versions; allows customers to leverage key features of the SAP GRC access; enables the control suite to rapidly identify and remove access and authorization risk from enterprise application systems and embed preventive controls into business processes to stop future violations. The result is a dramatic reduction in the time, risk, and cost associated with compliance by automating the analysis of rules and dependencies, detection of potential risks, and generation of reports and escalations to ensure compliance. The system enables a creative use of the /VIRSA/namespace to eliminate the need for code change or modification of the SAP GRC Access Controls Suite.

The adaptors offer the following advantages: real-time connectivity to older SAP versions; allows customers to leverage key features of the SAP GRC access; enables the control suite to rapidly identify and remove access and authorization risk from enterprise application systems and embed preventive controls into business processes to stop future violations. The result is a dramatic reduction in the time, risk, and cost associated with compliance by automating the analysis of rules and dependencies, detection of potential risks, and generation of reports and escalations to ensure compliance. The system enables a creative use of the /VIRSA/namespace to eliminate the need for code change or modification of the SAP GRC Access Controls Suite. The adaptors allow access control to be provided in older SAP software where such access control is not supported. In one example for security access control, a security administrator of the workflow management system uses the constraint specification console in order to specify dynamic separation of duty constraints, in terms of tasks, models and instances that come from the context sources described above. Theses constraints are e.g. of the form "task T1 and task T2 should be performed by a different user in any workflow instance". Furthermore, in that example, the secure task manager can act as the constraint enforcement point. This secure task manager queries the rule engine adaptor for facts of the form "Task T is forbidden to user U in workflow instance I". Such a setup allows for capturing and evaluating separation properties like: "A clerk must not sign loan contract if he was involved in the prior operations preparing the contract".

A constraint specification can be done by means of an access control system. An administrator defines or identifies context sources which are relevant for the application to be designed (operation 1). The identified relevant context sources provide a certain type of context information on which the specification of the application specific constraints is to be based (operation 2). The administrator connects at design time to a constraint specification console in order to specify application specific constraints based on the context information which will be provided at runtime by the identified relevant context sources 32 (operation 3). These constraints are forwarded by means of the constraint specification console 33 to a constraint converter component which is a component of a rule engine adaptor (operation 4). The constraints are then translated by the constraint converter component 34 into rules understandable by an underlying rule engine (operation 5). These translated constraints get stored in the rule engine as a set of rules (operation 6).

Next, a constraint enforcement is discussed through an example of a workflow system. An employee performs a certain task and enters a secure task manager (operation 1).

The secure task manager communicates with a query converter component which is a part of a respective rule engine adaptor (operation 2). Such communication with a query converter component is achieved in a uniform manner by using an appropriate communication API. The query converter component makes a link between the secure task manager and a rule engine. The secure task manager can query about certain types of facts, in the case shown here in form of a question "is employee allowed to perform the task". The query converter component translates the query originating from the secure task manager into a representation that is understandable by the rule engine (operation 3). The converted query is forwarded to the rule engine (operation 4) which answers to the translated query, the answer coming back from the rule engine to the query converter component (operation 5). The query converter component translates now the answer into a data structure that is understandable by the secure task manager and the translated answer contains a reply whether the employee is allowed to perform a specific task or not (operation 6). The secure task manager makes now an appropriate security decision, in the present case allowing or baring the employee from performing the task in question and notifies the employee accordingly (operation 7).

Figure 4:
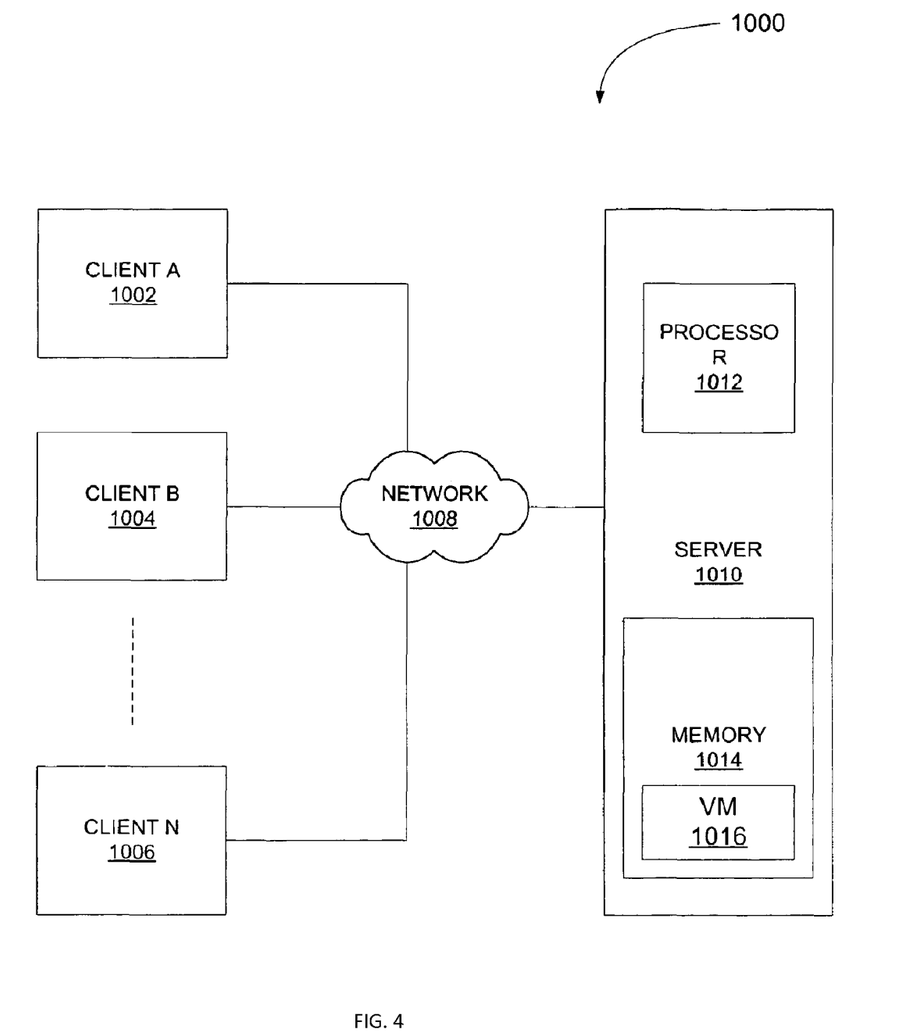
FIG. 4 illustrates an exemplary client/server system used in implementing one or more embodiments of the invention.

FIG. 4 illustrates an exemplary client/server system 1000 used in implementing one or more embodiments of the invention. In the illustrated embodiment, a network 1008 links a server 1010 with various client systems A-N 1002-1006. The server 1010 is a programmable data processing system suitable for implementing apparatus, programs, or methods in accordance with the description. The server 1010 provides a core operating environment for one or more runtime systems that process user requests. The server 1010 includes a processor 1012 and a memory 1014. The memory 1014 can be used to store an operating system a Transmission Control Protocol/Internet Protocol (TCP/IP) stack for communicating over the network 1008, and machine-executable instructions executed by the processor 1012. In some implementations, the server 1010 can include multiple processors, each of which can be used to execute machine-executable instructions. The memory 1014 can include a shared memory area that is accessible by multiple operating system processes executing at the server 1010. An example of a suitable server to be implemented using the client/server system 1000 may include J2EE compatible servers, such as the Web Application Server developed by SAP AG of Walldorf, Germany, or the WebSphere Application Server developed by International Business Machines Corp. of Armonk, N.Y. Client systems 1002-1006 are used to execute multiple applications or application interfaces. Each instance of an application or an application interface can constitute a user session. Each user session can generate one or more requests to be processed by the server 1010. The requests may include instructions or code to be executed on a runtime system (e.g., the virtual machine (VM) 1016) on the server 1010. A VM 1016 is an abstract machine that can include an instruction set, a set of registers, a stack, a heap, and a method area, like a real machine or processor. A VM 1016 essentially acts as an interface between program code and the actual processor or hardware platform on which the program code is to be executed. The program code includes instructions from the VM instruction set that manipulates the resources of the VM 1016.

Figure 5:
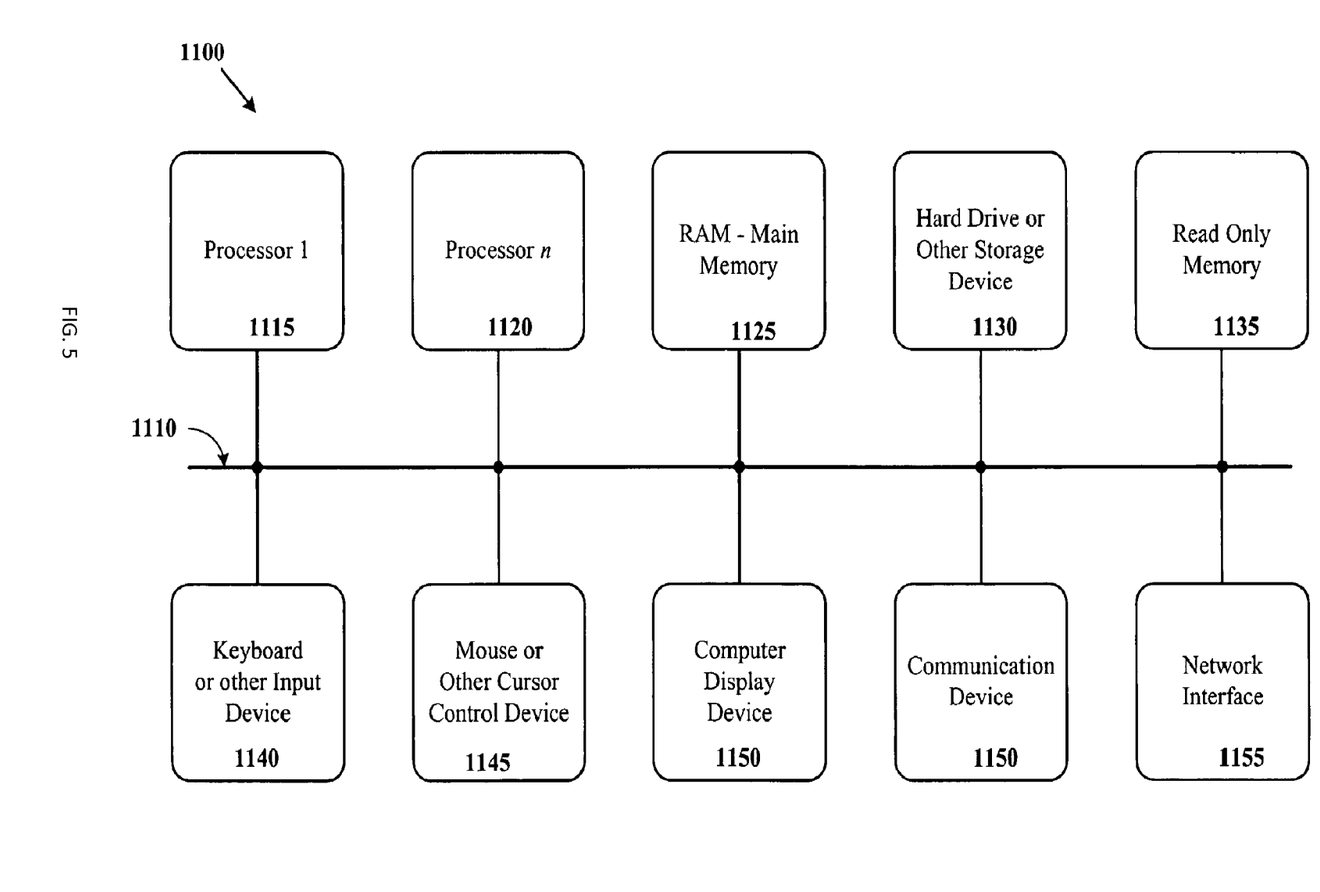
FIG. 5 is an exemplary computer system used in implementing an embodiment of the present invention.

FIG. 5 is an exemplary computer system 1100 used in implementing an embodiment of the present invention. In this illustration, a system 1100 comprises a bus 1110 or other means for communicating data. The system 1100 includes one or more processors, illustrated as shown as processor 1 1115 through processor n 1120 to process information. The system 1100 further comprises a random access memory (RAM) or other dynamic storage as a main memory 1125 to store information and instructions to be executed by the processor 1115 through 1120. The RAM or other main memory 1125 also may be used for storing temporary variables or other intermediate information during execution of instructions by the processors 1115 through 1120. A hard drive or other storage device 1130 may be used by the system 1100 for storing information and instructions. The storage device 1130 may include a magnetic disk or optical disc and its corresponding drive, flash memory or other nonvolatile memory, or other memory device. Such elements may be combined together or may be separate components. The system 1100 may include a read only memory (ROM) 1135 or other static storage device for storing static information and instructions for the processors 1115 through 1120. A keyboard or other input device 1140 may be coupled to the bus 1110 for communicating information or command selections to the processors 1115 through 1120. The input device 1140 may include a keyboard, a keypad, a touch-screen and stylus, a voice-activated system, or other input device, or combinations of such devices. The computer may further include a mouse or other cursor control device 1145, which may be a mouse, a trackball, or cursor direction keys to communicate direction information and command selections to the processors and to control cursor movement on a display device. The system 1100 may include a computer display device 1150, such as a cathode ray tube (CRT), liquid crystal display (LCD), or other display technology, to display information to a user. In some environments, the display device may be a touch-screen that is also utilized as at least a part of an input device. In some environments, the computer display device 1150 may be or may include an auditory device, such as a speaker for providing auditory information. A communication device 1150 may also be coupled to the bus 1110. The communication device 1150 may include a modem, a transceiver, a wireless modem, or other interface device. The system 1100 may be linked to a network or to other device using via an interface 11155, which may include links to the Internet, a local area network, or another environment. The system 1100 may comprise a server that connects to multiple devices. In one embodiment the system 1100 comprises a Java™ compatible server that is connected to user devices and to external resources.

While the machine-readable medium 1130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1100 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1100 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments, such as a J2EE environment or environments defined by other releases of the Java standard), or other environments (e.g., a NET environment, a Windows/NT environment each provided by Microsoft Corporation).

It should be noted that, while the embodiments described herein may be performed under the control of a programmed processor, such as processors 1115 through 1120, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method to provide functionality of a second version of a software to a first version, comprising:
   providing functionality in the second version of a software to the first version by determining at least one functionality available in the second version but not available in the first version; determining a reuse or adaptation of an adaptor framework in the first version; mapping the functionality of the second version to the first version; importing code in the second version to the first version; and deploying the adaptor framework in the first version, wherein the adaptor framework embeds preventive controls into business processes using access control with automatic analysis of rules and dependencies, detection of potential risks, and generation of reports and escalation to ensure compliance with business processes; and
   determining if the functionality is not available in the first version, performing a migration operation; analyzing how to provide the functionality currently available in the second version to the first version; analyzing a possibility of reusing or adapting a current adaptor framework in the first version or other version that do not support new functionality ; determining whether a backend functionality in the first version is supported by an Access Control software and identifying core functionality gaps between the first and second versions; analyzing a name space in the first version and mapping functionality of the second version Access Control software.

2. The method of claim 1, comprising defining a connector in an application for a backend system.

3. The method of claim 2, comprising determining whether the backend system is supported by an enterprise resource planning system.

4. The method of claim 2, comprising creating a connector to communicate with the backend system.

5. The method of claim 4, wherein the connector retrieves required data using an adaptor in the backend system.

6. The method of claim 2, comprising checking if a second adaptor is available for deployment in the backend system for the first version.

7. The method of claim 6, comprising deploying the second adaptor in the backend system and creating a connector in a front-end application.

8. The method of claim 7, wherein the backend system comprises an enterprise resource planning system.

9. The method of claim 7, wherein the front-end application comprises an enterprise resource planning system with governance, risk, and compliance application.

10. The method of claim 1, wherein the software comprises an enterprise-application software.

11. A system having a processor and a data storage device, comprising:
   a. an adaptor to provide functionality in a second version of a software to a first version by determining at least one functionality available in the second version but not available in the first version; determining a reuse or adaptation of an adaptor framework in the first version; mapping the functionality of the second version to the first version; importing code in the second version to the first version; and deploying the adaptor framework in the first version, wherein the adaptor framework embeds preventive controls into business processes using access control with automatic analysis of rules and dependencies, detection of potential risks, and generation of reports and escalation to ensure compliance with business processes; and b. a backend system coupled to the adaptor, the backend system determining if the functionality is not available in the first version, performing a migration operation; analyzing how to provide the functionality currently available in the second version to the first version; analyzing a possibility of reusing or adapting a current adaptor framework in the first version or other version that do not support new functionality ; determining whether a backend functionality in the first version is supported by an Access Control software and identifying core functionality gaps between the first and second versions; analyzing a name space in the first version and mapping functionality of the second version Access Control software.

12. The system of claim 11, comprising a connector in an application for a backend system.

13. The system of claim 12, comprising code to determine whether the backend system is supported by an enterprise resource planning system.

14. The system of claim 12, comprising a connector to communicate with the backend system.

15. The system of claim 14, wherein the connector retrieves required data using an adaptor in the backend system.

16. The system of claim 12, comprising code to check if a second adaptor is available for deployment in the backend system for the first version.

17. The system of claim 16, wherein the second adaptor is in the backend system, comprising a connector in a front-end application.

18. The system of claim 17, wherein the backend system comprises an enterprise resource planning system.

19. The system of claim 17, wherein the front-end application comprises an enterprise resource planning system with governance, risk, and compliance application.

20. The system of claim 11, wherein the software comprises an enterprise access control software.

* * * * *